(12) United States Patent
Temyanko et al.

(10) Patent No.: US 11,417,998 B2
(45) Date of Patent: Aug. 16, 2022

(54) BARE SINGLE MODE FIBER AMPLIFIER/LASER

(71) Applicants: Arizona Board of Regents on Behalf of the University of Arizona, Tucson, AZ (US); TIPD, LLC, Tucson, AZ (US)

(72) Inventors: Valery Temyanko, Tucson, AZ (US); Leonid Kotov, Tucson, AZ (US); Nasser Peyghambarian, Tucson, AZ (US)

(73) Assignees: Arizona Board of Regents on Behalf of the University of Arizona, Tucson, AZ (US); TIPD, LLC, Tucson, AZ (US)

( * ) Notice: Subject to any disclaimer, the term of this patent is extended or adjusted under 35 U.S.C. 154(b) by 349 days.

(21) Appl. No.: 16/875,574

(22) Filed: May 15, 2020

(65) Prior Publication Data

US 2021/0057867 A1 Feb. 25, 2021

Related U.S. Application Data

(60) Provisional application No. 62/891,366, filed on Aug. 25, 2019.

(51) Int. Cl.
*H01S 3/067* (2006.01)
*G02B 6/036* (2006.01)
(Continued)

(52) U.S. Cl.
CPC ......... *H01S 3/06754* (2013.01); *G02B 6/036* (2013.01); *H01S 3/094053* (2013.01); *G02B 6/02004* (2013.01); *H01S 3/09415* (2013.01)

(58) Field of Classification Search
None
See application file for complete search history.

(56) References Cited

U.S. PATENT DOCUMENTS

| 6,324,326 B1* | 11/2001 | Dejneka | G02B 6/1228 |
| | | | 359/341.1 |
| 2014/0204456 A1* | 7/2014 | Chavez-Pirson | G02F 1/3555 |
| | | | 359/326 |
| 2015/0062693 A1* | 3/2015 | Fishteyn | G02B 6/032 |
| | | | 359/341.1 |

(Continued)

OTHER PUBLICATIONS

A.S.KURKOV et al., High-power Yb-doped double-clad fiber lasers for a range of 0.98-1.04 μm., Fiber Optics Research Center at the GPI of the Russian Academy of Sciences, 2001 OSA/OAA 2001.

(Continued)

*Primary Examiner* — Eric L Bolda
(74) *Attorney, Agent, or Firm* — Schwegman Lundberg & Woessner, P.A.

(57) ABSTRACT

A gain fiber assembly for use in optical fiber amplification systems such as fiber amplifiers and fiber lasers utilizes an active or "bare" fiber that has a single glass cladding with an outer diameter of less is less than 80 μm and preferably less than 60 μm or even 40 μm. A passive double-clad input fiber is stripped of the outer cladding and tapered to match the outer diameter of the bare fiber. A glass-fluid or glass-vacuum interface along the taper provides guidance of the pump into and along the cladding of the bare fiber and a NA>1 for a vacuum or gasses and an NA>0.8 for liquids. This allows for much shorter fiber lengths to reach max signal power and higher pump conversion efficiencies.

20 Claims, 7 Drawing Sheets

(51) Int. Cl.
*H01S 3/094* (2006.01)
*H01S 3/0941* (2006.01)
*G02B 6/02* (2006.01)

(56) References Cited

U.S. PATENT DOCUMENTS

2018/0059323 A1\* 3/2018 Rivera ................. G02B 6/4296
2018/0267233 A1\* 9/2018 Bansal ................ H01S 3/06754

OTHER PUBLICATIONS

K.H. Yla-Jarkko et al., A 3.5 W 977 nm Cladding-pumped Jacketed Air-Clad Ytterbium-Doped Fiber Laser, Optoelectronics Research Centre, University of Southampton 2003 OSA/ASSP 2003.

M. Laroche et al., 20 W continuous-wave cladding-pumped Nd-doped fiber laser at 910 nm, Aug. 15, 2013 / vol. 38, No. 16 / Optics Letters.

M. Leich et al., Investigation of a large core 976nm Yb fiber laser for high brightness fiber-based pump sources, Proceedings of SPIE, SPIE LASE, 2014.

S. Aleshkina et al., 5.5 W monolitic single-mode fiber laser and amplifier operating near 976 nm, Proceedings of SPIE, SPIE LASE, 2016.

T. Matniyaz et al, Highly efficient cladding-pumped single-mode three-level Yb all-solid photonic bandgap fiber lasers, Optics Letters, Journal © 2019 Optical Society of America.

L.V. Kotov et al., 75 W 40% efficiency single-mode all-fiber erbium-doped laser cladding pumped at 976 nm, Optics Letters / vol. 38, No. 13 / Jul. 1, 2013.

D.A. Gaponov et al, Management of the high-order mode content in large (40 μm) core photonic bandgap Bragg fiber laser, Jul. 1, 2010 / vol. 35, No. 13 / Optics Letters.

C. Jauregui et al., Optimizing high-power Yb-doped fiber amplifier systems in the presence of transverse mode instabilities, Apr. 18, 2016 | vol. 24, No. 8 | DOI:10.1364/OE.24.007879 | Optics Express 7879.

X. Ma et al., Single-mode chirally-coupled-core fibers with larger than 50μm diameter cores, Apr. 21, 2014 | vol. 22, No. 8 | DOI:10.1364/OE.22.009206 | Optics Express 9206.

K. Bobkov et al., Sub-MW peak power diffraction-limited chirped-pulse monolithic Yb-doped tapered fiber amplifier, vol. 25, No. 22 | Oct. 30, 2017 | Optics Express 26959.

K. Abedin et al., Cladding pumped Yb-doped HOM power amplifier with high gain, Proceedings of SPIE, SPIE LASE, 2018.

L. Kotov et al., More than 100W, 18cm Yb-doped phosphate fiber amplifier, Proceedings of SPIE, SPIE LASE, 2019.

M.E. Likhachev et al., Large-Mode-Area Highly Yb-doped Photodarkening-Free Al2O3—P2O5—SiO2-Based Fiber, Fiber Optics Research Center of RAS, 38 Vavilov Street, Moscow, 2011 Conference on Lasers and Electro-Optics Europe and 12th European Quantum Electronics Conference (CLEO Europe/EQEC), May 2011, pp. 1-1.

\* cited by examiner

BARE SINGLE MODE FIBER AMPLIFIER/LASER

CROSS-REFERENCE TO RELATED APPLICATIONS

This application claims benefit of priority under 35 U.S.C. 119(e) to U.S. Provisional Application No. 62/891,366 entitled "Bare Single Mode Fiber Amplifier/Laser and Method of Manufacture" and filed on Aug. 25, 2019, the entire contents of which are incorporated by reference.

BACKGROUND OF THE INVENTION

Field of the Invention

This invention relates to optical fiber amplification systems such as fiber amplifiers and fiber lasers, and more particularly to a gain fiber assembly that provides the gain media for such systems.

Description of the Related Art

Lasers are becoming more important in the fields of spectroscopy, microscopy, remote sensing, communications, medicine, industry, and military. As laser applications expand, many new applications require higher power, wider spectral coverage, and higher pump-to-signal conversion efficiency. To improve the laser and amplifier performance, researchers and commercial laser and amplifier manufacturers are adopting fiber lasers in which the gain medium is rare earth doped optical fiber. Rare earth doped fiber lasers and fiber amplifiers provide solutions that require less space, reduced input power, and simpler packaging.

Optical fiber amplification systems such as fiber lasers and fiber amplifiers both use a rare earth doped active fiber as the gain media. In a fiber amplifier, a seed signal (typically from a low power laser) is injected into the fiber and amplifier where the signal is amplified by the gain medium. In a fiber laser, a cavity (typically formed by mirrors at opposite ends of the active fiber confine light to the gain media) confines the light to the active fiber. A pump provides the population inversion (the "pump signal") and the natural oscillations in the laser cavity are amplified and generate the laser signal that is coupled out of the cavity.

The typical structure of a commercial single-mode active fiber 100 used in construction of lasers and amplifiers is shown in FIG. 1. Signal light propagates primarily in a core 102 and is guided by a $1^{st}$ cladding 104. Pump light propagates primarily in core 102 and $1^{st}$ cladding 104 and is guided by a $2^{nd}$ cladding 106. The pump light travelling in the core is absorbed and re-emitted at a longer wavelength by the gain media in the core increasing the signal power along the length of the fiber. For laser and amplifier designs, the following are key considerations, (1) an active fiber length which is shorter than the distance for the onset of parasitic non-liner effects such as self-phase modulation (SPM), four wave mixing (FWM), stimulated Brillouin scattering (SBS), and stimulated Raman scattering (SRS) or amplified stimulated emission (ASE), (2) achieving as high efficiency (Pout vs Ppump) as possible, and (3) integration with commercial fiber components. Simultaneously satisfying all three elements requires that the diameters of the core 102, $1^{st}$ cladding 104 and $2^{nd}$ cladding 106 of the active fiber 100 be optimized and integrated into a laser or amplifier.

Suppression of the onset of parasitic non-linear effects is key to the successful design of high peak power pulsed systems or narrow-linewidth lasers and amplifiers. Both the signal and parasitic non-linear effects grow with increasing length of the active fiber but beyond a certain length the parasitic non-linear effects begin to dominate and the signal output plateaus, begins to decrease or acquires undesirable spectral properties.

The shorter wavelength pump causes a population inversion in the core and enables gain at the signal wavelength. The higher the population inversion, the greater the gain per unit length and the shorter the active fiber can be to reach the desired output power. The shorter active fiber avoids the onset of the parasitic non-linearities or ASE. To maximize the pump absorption and thus the population inversion in the core 102, the amplifier or laser system needs to concentrate as much of the pump power in the core of the fiber as possible.

To a first order for multi watt-level systems, the majority of the pump light travels in the $1^{st}$ cladding 104 and core 102 of the fiber. The amount of pump light overlapping with the core is proportional to the ratio of the area of core 102 to the area of $1^{st}$ cladding 104. Since the cross-sectional area of the fiber is proportional to the square of the diameter, the output power of the laser or amplifier per unit length is proportional to the square of the ratio of the core diameter ($d_{core}$) to the $1^{st}$ cladding diameter ($d_{1st\ cladding}$) as shown in Eqn 1.

$$\text{Signal Power per unit length} \propto \left(\frac{d_{core}}{d_{1st\ cladding}}\right)^2 \quad (1)$$

The highest population inversion can be achieved when the ratio of the diameter of the core to the diameter of the $1^{st}$ cladding (the core-to-cladding ratio) is as large as possible.

There are two ways to maximize the core-to-cladding diameters ratio: make the core diameter as large as possible or make the $1^{st}$ cladding diameter as small as possible. In single mode laser and amplifier applications, the maximum core diameter is determined by the size required for single mode operation.

$$d_{core} < \frac{2.405\lambda}{\pi NA} \quad (2)$$

where λ is the wavelength and NA is the numerical aperture of the double clad fiber. The numerical aperture is a dimensionless number that characterizes the range of angles over which the fiber can accept or emit light.

Researchers [C. Jauregui, J. Limpert, and A. Tünnermann, Nat. Photonics 7(11), 861 (2013), X. Ma, C. Zhu, I-N. Hu, A. Kaplan, and A. Galvanauskas, Opt. Express 22, 9206 (2014), K. Bobkov, A. Andrianov, M. Koptev, S. Muravyev, A. Levchenko, V. Velmiskin, S. Aleshkina, S. Semjonov, D. Lipatov, A. Guryanov, A. Kim, and M. Likhachev, Opt. Express 25, 26958 (2017), K. S. Abedin, R. Ahmad, A. M. DeSantolo, J. W. Nicholson, P. S. Westbrook, C. Headley, D. J. DiGiovanni, Proc. SPIE 10512, 105121E (2018), L. Kotov, M. Akbulut, A. Chavez-Pirson, J. Zong, and N. Peyghambarian, Proc. SPIE 10897, 108970X (2019), M. E. Likhachev, S. S. Aleshkina, A. V. Shubin, M. M. Bubnov, E. M. Dianov, D. S. Lipatov, and A. N. Guryanov, in CLEO EUROPE/EQEC 2011 Conference Digest, paper CJ_P24 (2011)] have tried several approaches to make large core fiber-based systems operating in a single-mode regime but have not been able to increase the core diameter beyond the beyond the single mode core limit. Besides, such fibers cannot be easily spliced to standard double-clad fibers, thus making it difficult to manufacture all-fiber optical devices.

With the maximum achievable core diameter set by equation 2, the other approach to achieving a large core-to-cladding ratio is to decrease the $1^{st}$ cladding diameter. The minimum diameter of a $1^{st}$ cladding is set by the NA of the pump light source and the NA that can be supported by refractive indexes of the $1^{st}$ cladding and $2^{nd}$ cladding. According to the brightness conservation theorem (also called conservation of the Etendue, which characterizes how spread out light is in an area and angle), Eqn 3, attempts to launch pump light into the cladding of a fiber with a smaller $1^{st}$ cladding diameter (by means of free space optics or by fiber tapering) leads to the increase of pump light's NA. Most fiber manufacturers use fused silica glass and low-index polymers for the $1^{st}$ and $2^{nd}$ claddings. At a working pressure of 1 atm and ambient temperature at 1 μm, the RI for fused silica is 0.45 and for polymer is 0.37 resulting in fibers with an NA of 0.46 or less. At the same time, commercially available pigtailed pump sources operating near 1 μm typically have the smallest fiber $1^{st}$ cladding diameter of 105 μm and NA of 0.15-0.22. Thus, light from these diodes theoretically can be coupled into an active fiber guiding 0.45 NA with cladding diameter 35-50 μm, while still conserving Etendue.

$$NA_1 * Area_1 \geq NA_2 * Area_2 \quad (3)$$

Where light travels from surface 1 to surface 2 and $NA_1$ and $NA_2$ are the numerical apertures of surface 1 and 2 and $Area_1$ and $Area_2$ are the areas of surface 1 (input fiber $1^{st}$ cladding) and 2 (active fiber $1^{st}$ cladding), corresponding to $D_1$ and $D_2$ of the $1^{st}$ cladding respectively.

However, fabricating and scaling the power in all-fiber lasers and amplifiers requires integrating pump/signal combiners into the fiber chain composed of other fiber components. Commercially available combiners typically have output fibers with 125 μm or larger $1^{st}$ cladding diameters with maximum pump guidance NA of 0.46. The typical integration of a pump combiner and active fiber 100 is shown in FIG. 2. The pump combiner has a passive double-clad fiber 110 ("fiber pigtail"). The pigtail has a core 112, $1^{st}$ cladding 114 and $2^{nd}$ cladding 116. The ends of fiber pigtail 110 and active fiber 102 are stripped of their $2^{nd}$ cladding, cleaved, and spliced together at a splice 118. The stripped portion of the fibers is recoated with a coating 120. To minimize the power loss at the splice 118, the active fiber should have the same or a larger $1^{st}$ cladding diameter than the pump combiner fiber to avoid pump loss at the splice. An optical signal 122 propagates in pigtail core 112 and is coupled into the active fiber core 102. An optical pump 124 is guided by $2^{nd}$ cladding 116 and coupled into the active fiber 100 to activate the gained media.

The brightness conservation theorem (Eqn 3) prohibits decreasing the diameter of the $1^{st}$ cladding of the active fiber below a 125 μm diameter while keeping the pump at the same NA. To accommodate smaller $1^{st}$ cladding diameters in the active fiber, researchers have tried approaches to increase the NA of the $1^{st}$ cladding by changing the $2^{nd}$ cladding to a Teflon coating or using an air hole $2^{nd}$ cladding. These approaches were able to provide $1^{st}$ cladding NAs as high as 0.6 [K. H. Ylä-Jarkko, R. Selvas, D. B. S. Son, J. K. Sahu, C. A. Codemard, J. Nilsson, S. A. Alam, and A. B. Grudinin, in Advanced Solid State Photonics, J. Zayhowski, ed., Vol. 83 of OSA Trends in Optics and Photonics, paper 103 (2003), L. V. Kotov, M. E. Likhachev, M. M. Bubnov, O. I. Medvedkov, M. V. Yashkov, A. N. Guryanov, J. Lhermite, S. Février, and E. Cormier, Opt. Lett. 38, 2230 (2013)]. In these cases, the $1^{st}$ cladding diameter of an active fiber might be decreased to ~95 μm. However, these techniques are still NA limited and make fiber manufacturing and handling more complicated.

For many applications current fiber components are not available that provide the correct combination of core-to-cladding ratio, $1^{st}$ cladding diameter, single mode core diameter and NA to build a cladding-pumped high gain laser or amplifier.

To minimize the length of the active fiber, designers want to fabricate fibers with a high core-to-$1^{st}$ cladding diameter ratio because pump absorption, and thus the gain, of cladding-pumped fibers is proportional to approximately the square of core to cladding diameter ratio. A core-to-cladding ratio of 1:10 is the maximum value for the single mode commercial double cladding fibers designed for 1 micron operation. More typical values are 1:12 up to 1:20. The improved pump absorption leads to a high population inversion of the active ions, which is beneficial for gain media operating with three-level energy systems. For instance, in Yb-doped fiber lasers at 976 nm, or Nd-doped fiber lasers near 920 nm operation with a high inversion allows suppressing amplified spontaneous emission (ASE) above 1 μm and improves their performances [A. S. Kurkov, O. I. Medvedkov, V. M. Paramonov, S. A. Vasiliev, E. M. Dianov, V. Solodovnikov, V. Zhilin, A. N. Guryanov, A. Y. Laptev, and A. A. Umnikov, in Optical Amplifiers and Their Applications, paper OWC2, (2001), K. H. Ylä-Jarkko, R. Selvas, D. B. S. Son, J. K. Sahu, C. A. Codemard, J. Nilsson, S. A. Alam, and A. B. Grudinin, in Advanced Solid State Photonics, J. Zayhowski, ed., Vol. 83 of OSA Trends in Optics and Photonics, paper 103 (2003), M. Laroche, B. Cadier, H. Gilles, S. Girard, L. Lablonde, and T. Robin, Opt. Lett. 38, 3065 (2013), M. Leich, M. Jáger, S. Grimm, J. Dellith, D. Hoh, S. Jetschke, M. Becker, A. Hartung, T. Eschrich, J. Kobelke, H. Bartelt, Proc. SPIE 8961, 89610Z (2014), S. S. Aleshkina, M. E. Likhachev, D. S. Lipatov, O. I. Medvedkov, K. K. Bobkov, and A. N. Guryanov, Proc. SPIE 9728, 97281C (2016), T. Matniyaz, W. Li, M. Kalichevsky-Dong, Th. W. H., J. Parsons, G. Gu, and L. Dong, Opt. Lett. 44, 807 (2019), V. Kotov, M. E. Likhachev, M. M. Bubnov, O. I. Medvedkov, D. S. Lipatov, N. N. Vechkanov, A. N. Gur'yanov, Quantum Electron., 42(5), 432 (2012)]. In addition, it has been demonstrated that increasing the core-to cladding diameter ratio significantly improves pump conversion efficiency of cladding-pumped Yb-free Er-doped fiber lasers [L. V. Kotov, M. E. Likhachev, M. M. Bubnov, O. I. Medvedkov, M. V. Yashkov, A. N. Guryanov, J. Lhermite, S. Février, and E. Cormier, Opt. Lett. 38, 2230 (2013), D. A. Gaponov, S. Février, M. Devautour, P. Roy, M. E. Likhachev, S. S. Aleshkina, M. Y. Salganskii, M. V. Yashkov, and A. N. Guryanov, Opt. Lett. 35, 2233 (2010)].

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a gain fiber assembly for use in a cladding-pumped optical fiber amplification system such as a fiber amplifier or fiber laser. The gain fiber assembly provides much higher pump conversion efficiencies, which allows for much shorter fiber lengths to achieve equivalent levels of output power. As such, the length of fiber can be selected to maximize output power while avoiding the onset of non-linear effects or ASE.

In an embodiment, a gain fiber assembly comprises a passive double-clad input fiber ("input fiber") that is spliced to an active single mode fiber ("bare fiber"). The input fiber includes a passive core with diameter D1, a $1^{st}$ glass cladding of diameter D2 and a $2^{nd}$ cladding, typically polymer, of diameter D3 configured to receive and propagate an optical signal in the passive core and an optical pump that propagates in the passive core and the $1^{st}$ glass cladding. The $2^{nd}$ cladding is removed from an end section, and the input fiber (the core and $1^{st}$ cladding) is tapered to a smaller diameter D4<D2. The bare fiber includes an active fiber core and only a $1^{st}$ glass cladding having a diameter D4 less than 80 microns and preferably less than 60 microns and even less than 40 microns. The active single-mode fiber is spliced to the tapered diameter of the input fiber. A glass-fluid or glass-vacuum interface along the taper and the active single mode fiber provides guidance of the optical pump into and along the $1^{st}$ cladding of the active single mode fiber.

The glass-fluid or glass-vacuum interface for the bare fiber can be formed by completely removing the $2^{nd}$ cladding layer from the fiber leaving only the $1^{st}$ glass cladding and core, hence the name "bare fiber" or by fabricating the fiber without the $2^{nd}$ cladding. The high refractive index difference between glass and fluid or glass and vacuum produces a NA that is larger than 0.8 and typically greater than 1. The large NA allows the diameter of the bare fiber's $1^{st}$ glass cladding to be reduced and increase the core-cladding ratio. The large NA enables the efficient coupling of light from commercial input fibers with large $1^{st}$ cladding diameters into the bare fiber with a smaller $1^{st}$ cladding diameter satisfying the conservation of Etendue. The $2^{nd}$ cladding is stripped from an end of the commercial input fiber and the fiber's core and $1^{st}$ cladding are tapered to match the smaller $1^{st}$ cladding diameter of the bare fiber. The smaller $1^{st}$ cladding diameter of the bare fiber increases the power density of the pump light and results in a higher population inversion of the rare earth ions. The higher population inversion increases the pump to signal efficiency and shortens the length of the gain medium suppressing the parasitic effects from non-linear processes such as stimulated Brillion and Raman scattering or self-phase modulation.

In an embodiment, the input fiber's $1^{st}$ glass cladding diameter D2 is greater than 105 microns and the active single mode fiber's $1^{st}$ glass cladding diameter D4 is less than 60 microns and possibly less than 40 microns.

In different embodiments, the input fiber's NA is less than 0.6. If the fluid is a gas in which 1<RI<1.01, the NA of the bare fiber is greater than 1. If the fluid is a liquid in which 1<RI<1.2, the NA of the bare fiber is greater than 0.8.

In an embodiment, the input and output fibers comprise fused silica having an RI of approximately 4.5. The active single mode fiber comprises a different glass having a RI greater than that of fused silica.

In an embodiment, an enclosure houses the tapered end section of the input fiber and active single mode fiber with the passive double-clad input and output fibers penetrating through the enclosure. Inlet and outlet ports in the enclosure are configured to receive, circulate and remove a fluid to remove heat from the active single mode fiber.

In an embodiment, the tapered end section of the input fiber and the active single mode fiber are housed in a vacuum enclosure. The glass-vacuum interface guides the optical pump along the tapered end section and the active single mode fiber These and other features and advantages of the invention will be apparent to those skilled in the art from the following detailed description of preferred embodiments, taken together with the accompanying drawings, in which:

DETAILED DESCRIPTION OF THE INVENTION

The present invention provides a gain fiber assembly for use in optical fiber amplification systems such as fiber amplifiers and fiber lasers. The assembly utilizes an active or "bare" fiber that has a single cladding layer with an outer diameter of less is less than 80 µm and preferably less than 60 µm. A passive double-clad input fiber is stripped of the outer cladding and tapered to match the outer diameter of the bare fiber. A glass-fluid or glass-vacuum interface along the taper provides guidance of the pump into the cladding of the bare fiber. The NA of the gain fiber is at least 0.8 for liquids and 1.0 for gasses or vacuum. The gain fiber assembly provides much higher pump conversion efficiencies, which allows for much shorter active fiber lengths to achieve equivalent levels of output power. As such, the length of fiber can be selected to maximize output power while avoiding the onset of non-linear effects or ASE.

Figure 1:
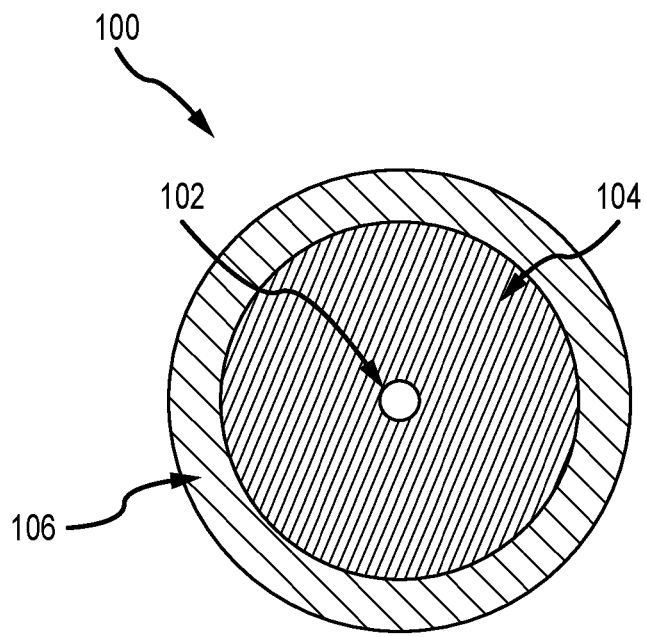
FIG. 1, as described above, is an end view of a typical passive double clad fiber.
Figure 2:
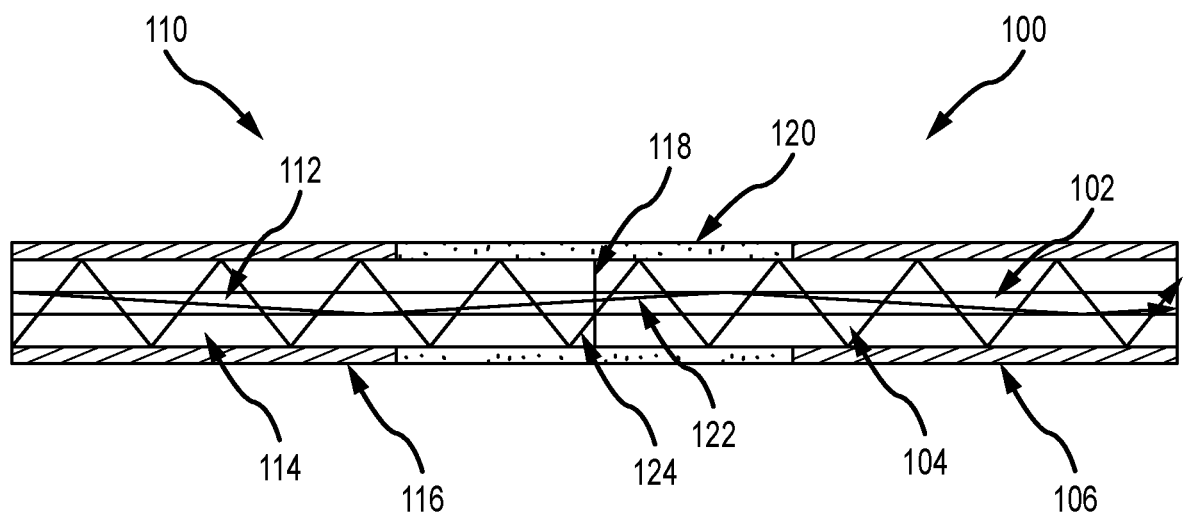
FIG. 2, as described above, is side sectional view of a splice of a pump combiner passive double-clad fiber to an active double-clad fiber.
Figure 3:
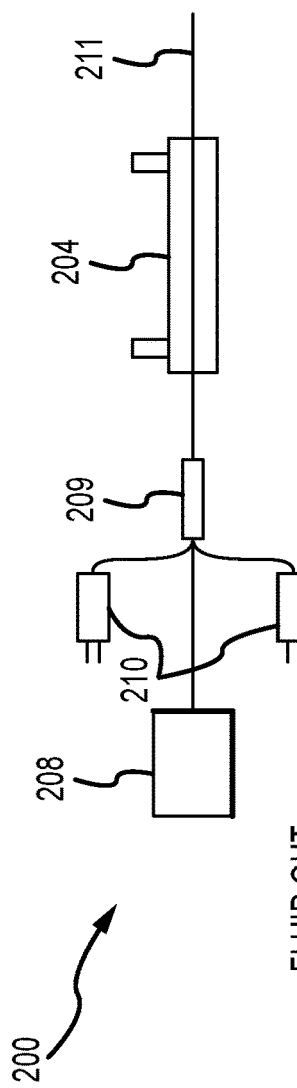
FIG. 3 is an illustration of an embodiment of a fiber amplifier in accordance with the invention.
Figure 4A:
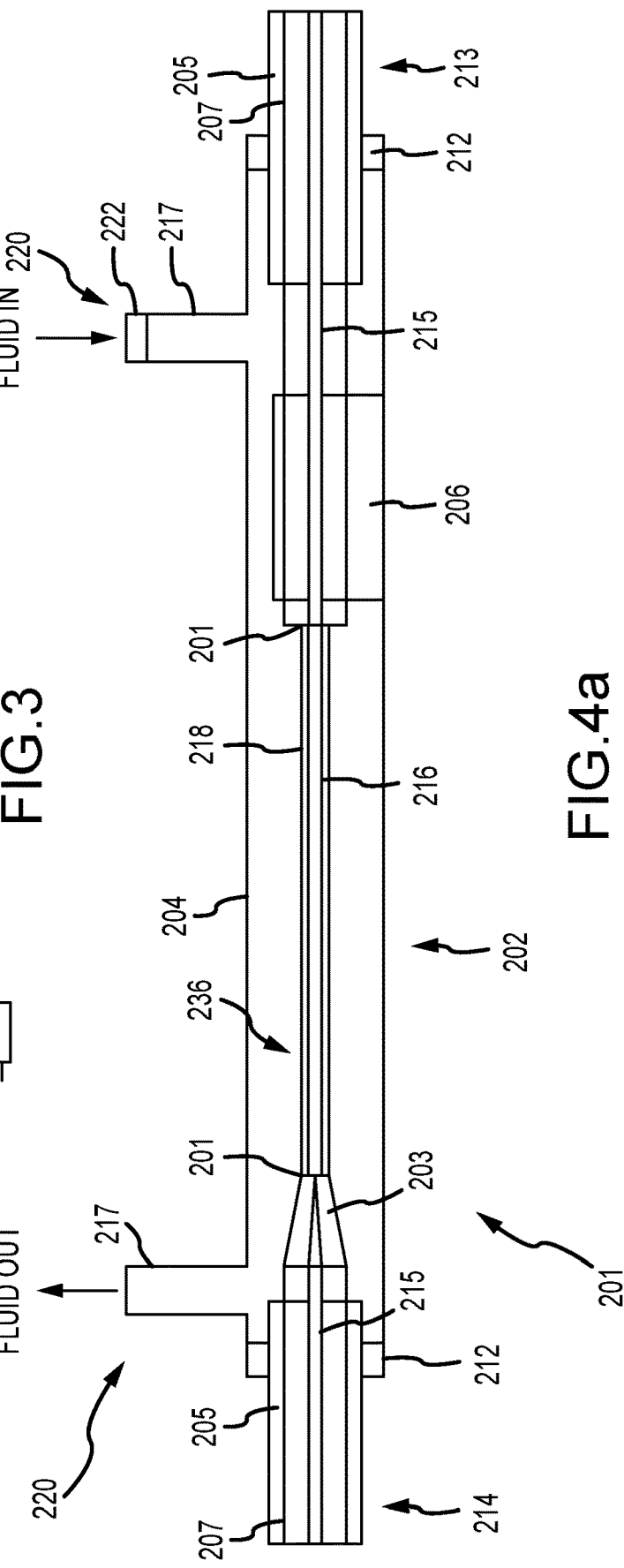
FIGS. 4a and 4b are side section views of an embodiment of a gain fiber assembly including a passive double-clad input fiber ("input fiber") with a bare tapered section spliced to an active single mode fiber ("bare fiber") spliced to a passive double-clad output fiber ("output fiber")
Figure 4B:
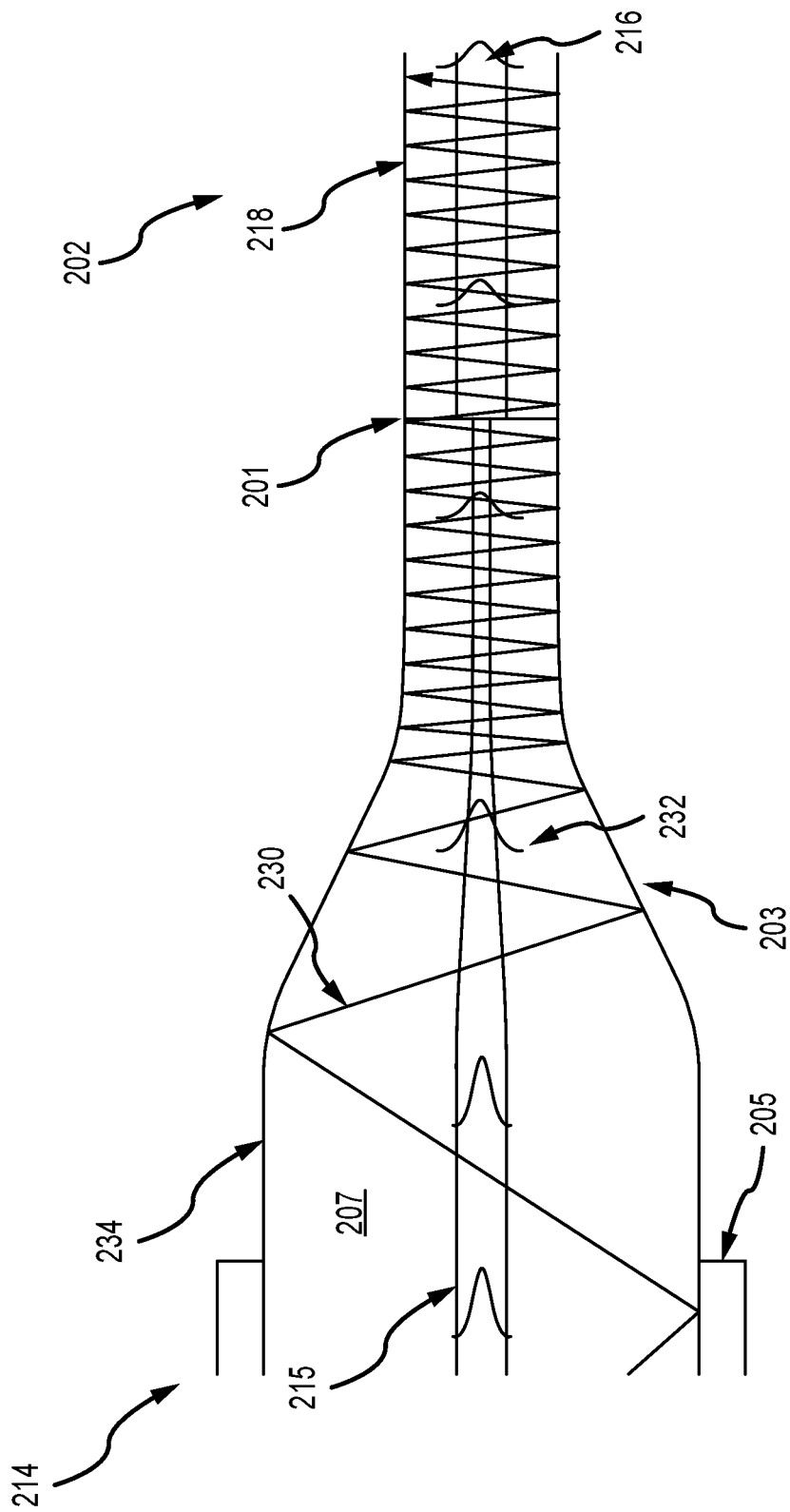

Referring now to FIGS. 3 and 4a-4b, an embodiment of a fiber amplifier 200 includes a gain fiber assembly 201 in which an active single mode fiber ("bare fiber") 202 is spliced between passive double-clad input and output fibers 214 and 213. Bare fiber 202 is suitably housed in a tube 204 with input and output fibers 214 and 213 fixed and extending from opposite ends of the sealed enclosure. A source of seed radiation 208 and a pair of pump diodes 210 are coupled using a pump combiner 209 whose pigtail provides input fiber 214. An optical pump 230 activates the gain medium in bare fiber 202 to amplify an optical signal 232 provided by the source and output an amplified optical signal in output fiber 213.

Bare fiber 202 has a doped core 216 e.g. rare earth dopants, and only a $1^{st}$ glass cladding 218, no $2^{nd}$ cladding. The diameter (D4) of $1^{st}$ glass cladding 218 is less than 80 µm and preferably less than 60 µm and even less than 40 µm.

The core-to-1$^{st}$ cladding diameter ratio of the bare fiber is 1:N where N is 8 or less. Bare fiber 202 is designed and manufactured based on the desired gain, pump absorption, efficiency, mode size, etc. for the wavelength of interest. Bare fiber 202 can be manufactured as a double-clad active fiber in which the 2$^{nd}$ polymer cladding is completely removed post-manufacture, hence the name "bare fiber". Alternately, the bare fiber can be manufactured without the 2$^{nd}$ polymer cladding. The term "bare fiber" is used to refer to the single-clad active fiber regardless of method of manufacture. Double-clad fibers are so prevalent that it is often less expensive to jus strip the outer cladding. The single clad bare fiber provides a glass-fluid or glass-vacuum interface 236.

Passive double-clad input fiber 214 has a passive core 215 with diameter D1, a 1$^{st}$ glass cladding 207 with diameter D2 and a 2$^{nd}$ polymer cladding 205 with a diameter D3, which is typically at least 105 μm. An end section is stripped of polymer cladding 205 and the passive core 215 and 1$^{st}$ cladding 207 are tapered to form a tapered end section 203 with a smaller outer final diameter D4<D2 to match the diameter of bare fiber 202 and joined at splice 201. The end section 203 is preferably adiabatically tapered so that the signal and pump are coupled from the input fiber to the bare fiber without loss to the surrounding environment. The diameter D1 of passive core 215 is less than the diameter of the active core 216 at splice 201. In the most efficient embodiments, the diameter D1 of passive core 215 is less than the diameter of the active core 216 along the entire length of the input fiber. As shown there is a small section 234 between the double-clad portion of the input fiber and the tapered end section 203 that is also bare, devoid of the 2$^{nd}$ polymer cladding 205. This is an artifact of stripping the 2$^{nd}$ polymer cladding and then heating the input fiber to form the taper.

The source of seed radiation 208 generates optical signal 232 that propagates in the passive core 215 of the input fiber 214 and the pump diodes 210 generate optical pump 230 that propagates in the fiber core 215 and 1$^{st}$ glass cladding 207 and extends into the 2$^{nd}$ polymer cladding 205 of the input fiber as guided by 2$^{nd}$ polymer cladding 205. The optical pump is guided by a fluid (e.g. a gas such as air or a liquid) or a vacuum in the 1$^{st}$ glass cladding 207 of input fiber 214 in a short (one or few cm) distance 235 before taper 203 and along taper 203 and into the 1$^{st}$ cladding 218 of bare fiber 202. The glass-fluid or glass-vacuum interface guides the optical pump along bare fiber 202 as well. The high refractive index difference between glass either a fluid such as air or a vacuum allows the pump to be launched through taper 203 into the bare fiber 202 of a small outer diameter (OD) less than 80 μm and preferably less than 60 μm without any loss up to the limit that is set by conservation of brightness law as described in Eqn. 3. The glass-fluid or glass vacuum interface also provides a larger NA of the bare fiber. For a vacuum and gasses NA>1 and for suitable liquids NA>0.8.

The other end of the bare fiber 202 is joined at spliced 201 to a passive double-clad output fiber 213, which may be a commercially available or custom fiber with mode field diameter matched to that of the bare fiber. As depicted, output fiber 213 is the same passive double-mode fiber as input fiber 214 with passive fiber core 215, a 1$^{st}$ glass cladding 207 and a 2$^{nd}$ polymer cladding 205. The input and output fibers need not be the same. In an embodiment, 2$^{nd}$ polymer cladding 205 is stripped off the spliced end of output fiber 213, which is placed into a high-index transparent polymer 206 to remove unabsorbed pump power. Other configurations may be used remove unabsorbed pump power within the amplifier.

To protect the non-coated fibers e.g. the tapered end of input fiber 214, bare fiber 202 and the stripped end of output fiber 213, from dust, particles or any contamination from the environment that can damage the high power gain fiber assembly, the non-coated fibers are sealed into tube 204, which can be formed of a glass, metal or other material. The tube has two side sleeves 217 that provide the inlet and outlet for a cooling fluid 220 to cool the bare fiber 202 and high index polymer pump stripper 206. A filter 222 may be positioned at inlet sleeve 217 to remove particles and prevent particle accumulation on the 1$^{st}$ cladding of the input, bare and output fibers. The input and output fibers are fixed in the tube with adhesive epoxy or other suitable sealant/adhesive 212 to form a sealed enclosure. In certain applications, a sealed enclosure is not required. The gain fiber assembly could reside in atmosphere and present a glass-air interface.

Cooling fluid 220 may be a gas such as air (n=1.000293), Acetone (n=1.001090), Alcohol, ethyl (n=1.000878), Argon (n=1.000281), Helium (n=1.00035) or Nitrogen (n=1.000298) to name a few. The refractive index n is typically cited at a 1 μm wavelength at a working pressure of 1 atm and ambient room temperature. Any suitable gas will have an index 1.0<n<1.01. Cooling fluid 220 may also be a liquid have an index 1.0<n<1.2. Liquids provide better heat transfer properties than gasses but have a higher index, and thus a lower NA albeit still >0.8.

In an alternate embodiment, the tube is a sealed vacuum enclosure. A perfect vacuum has index of 1.000000 and thus provides the largest index difference with the 1$^{st}$ glass cladding of the bare fiber.

Most commercially available double-clad fibers are made from fused silica, which has an index of 1.45 for the 1$^{st}$ glass cladding. The 2$^{nd}$ polymer cladding has an index of 1.37. Generally, the most robust structure for the gain fiber assembly will be achieved if all fibers (input, output and bare) are made from fused silica with the 2$^{nd}$ polymer cladding removed as previously described to create the higher contrast interfaces. However, in certain applications (mainly due to different gain spectra and doping levels of the rare earth elements) it would be beneficial to have the bare fiber made of glasses other than fused silica. The gain fiber could be made from glasses such as phosphate, tellurite, germanite, fluoride and chalcogenide, which all have indices greater than that of fused silica. These glasses will allow a smaller outer diameter for the bare fiber due to the greater refractive index, thus providing a larger NA.

Figure 5:
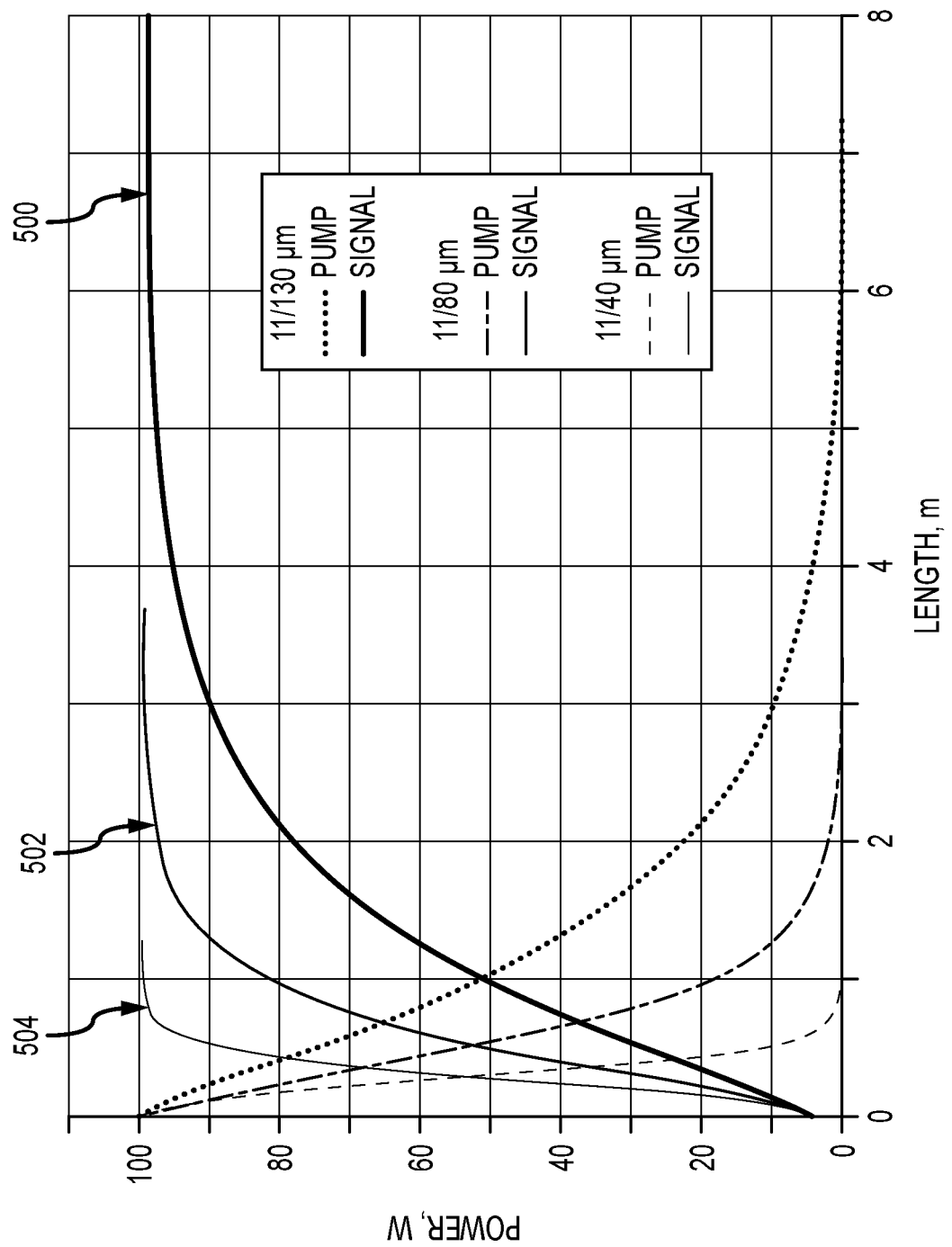
FIG. 5 is a plot of signal and pump power along the bare fiber for different $1^{st}$ cladding diameters.

High pump absorption is essential for high-peak power and single-frequency systems, where short bare fiber length is required to suppress nonlinear effects such as self-phase modulation (SPM), four wave mixing (FWM), stimulated Brillouin scattering (SBS), and stimulated Raman scattering (SRS). To demonstrate the influence of the first cladding diameter on effective fiber length, we numerically solved the rate equations and simulated signal and pump powers evolution in a co-pumped power amplifier configuration. First, commercially available Yb-doped fiber (Nufern LMA-YDF-10/130-VIII) was simulated as an embodiment of the "bare fiber". The fiber has core/cladding diameters of 11/130 μm (NA of 0.08/0.46) and a cladding pump absorption 4 dB/m at 976 nm. Signal/pump power at the input and wavelength were chosen to be 5/100 W and 1030/976 nm. The optimal bare fiber length (length at which signal power reaches maximum) for 11/130 fiber was found to be ~8 m. When cladding diameter was reduced to 80 and 40 μm the optimal fiber length decreased down to ~3.5 m and ~1 m respectively. The length of the fiber is reduced by a square of the ratio of outer diameters for two fibers under comparison. The output power versus fiber length for $1^{st}$ cladding diameters of 130, 80 and 40 μm 500, 502 and 504 are plotted in FIG. 5.

Figure 6:
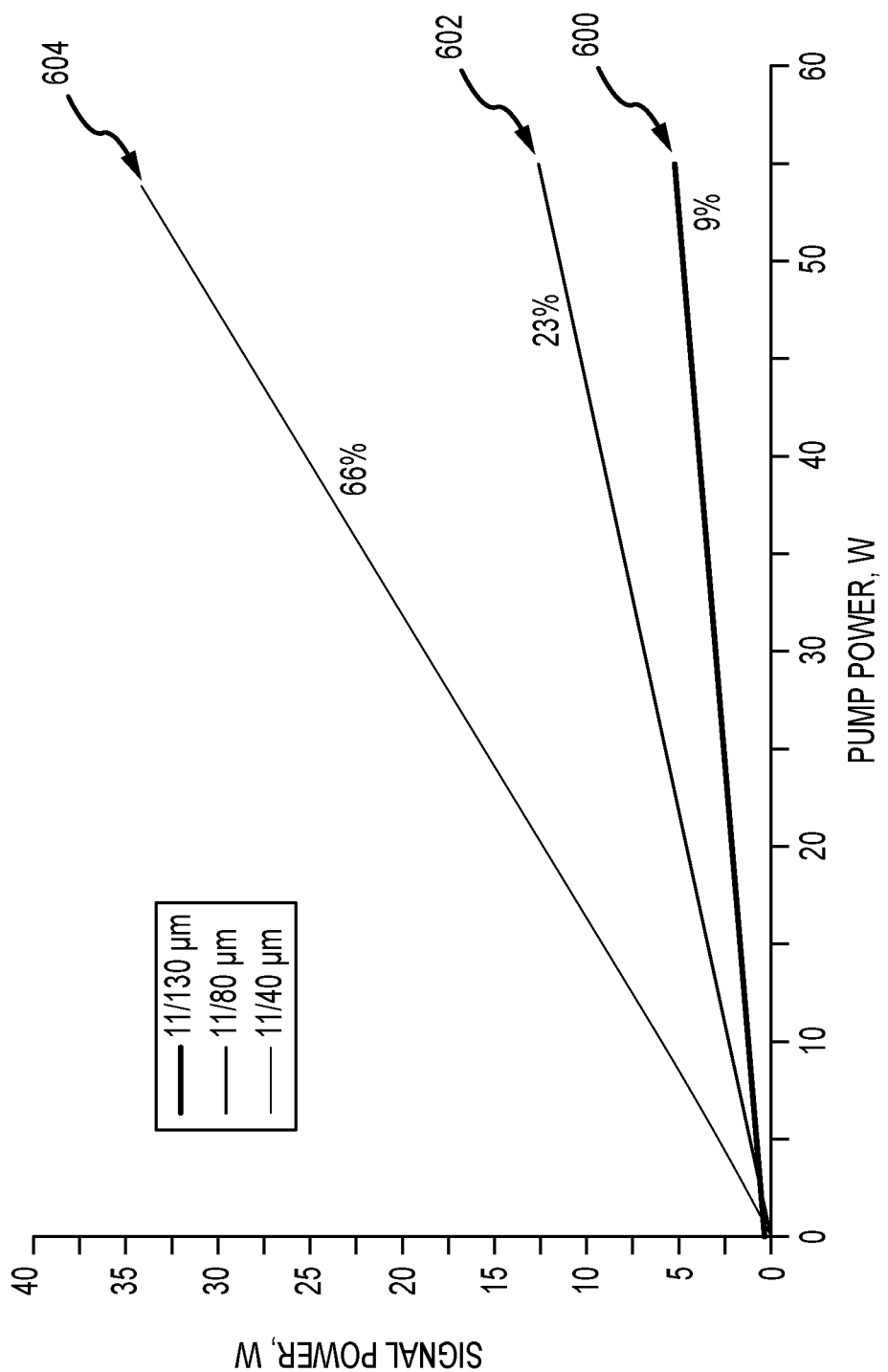
FIG. 6 is a plot of pump conversion efficiency for different cladding diameters of the bare fiber.

Another benefit of a bare fiber having a smaller cladding diameter is higher pump brightness, which can improve performance of some lasers operating in three-level energy systems such as Yb-/Nd-doped fiber lasers at 976/915 nm. High brightness increases a population inversion and allows suppressing parasitic amplified spontaneous emission (ASE) at longer wavelengths. We simulated operation of an Yb-doped power amplifier at 976 nm and studied influence of the cladding diameter on its pump conversion efficiency. A model that takes into account pump, signal and a co-propagating ASE at 980-1080 nm was used in the simulation. The calculations were performed for the same fibers as before. For each fiber the optimal length was defined and then pump conversion efficiency was estimated for the amplifier. The efficiencies 600, 602 and 604 for $1^{st}$ cladding diameters of 130, 80 and 40 μm are presented in FIG. 6. It can be seen clearly that the reduction of the $1^{st}$ cladding diameter of the bare fiber results in drastic improvement of the pump conversion efficiency of 976 nm Yb-doped fiber amplifier.

As a proof of concept for the proposed fiber amplifier design we demonstrated a 976 nm laser/amplifier based on a 40 μm outer diameter Yb-doped fiber. The bare fiber had a 12 μm core based on photo-darkening-free low-NA $Al_2O_3$—$P_2O_5$—$SiO_2$ glass matrix. The higher order mode cutoff wavelength was found to be ~900 nm and the mode-field diameter (MFD) at 976 nm~10.1 μm. The $1^{st}$ cladding of the bare fiber was square shaped to provide good cladding mode mixing for better pump absorption. The area of the square cladding was the same as that of a circular 45 μm fiber.

Figure 7:
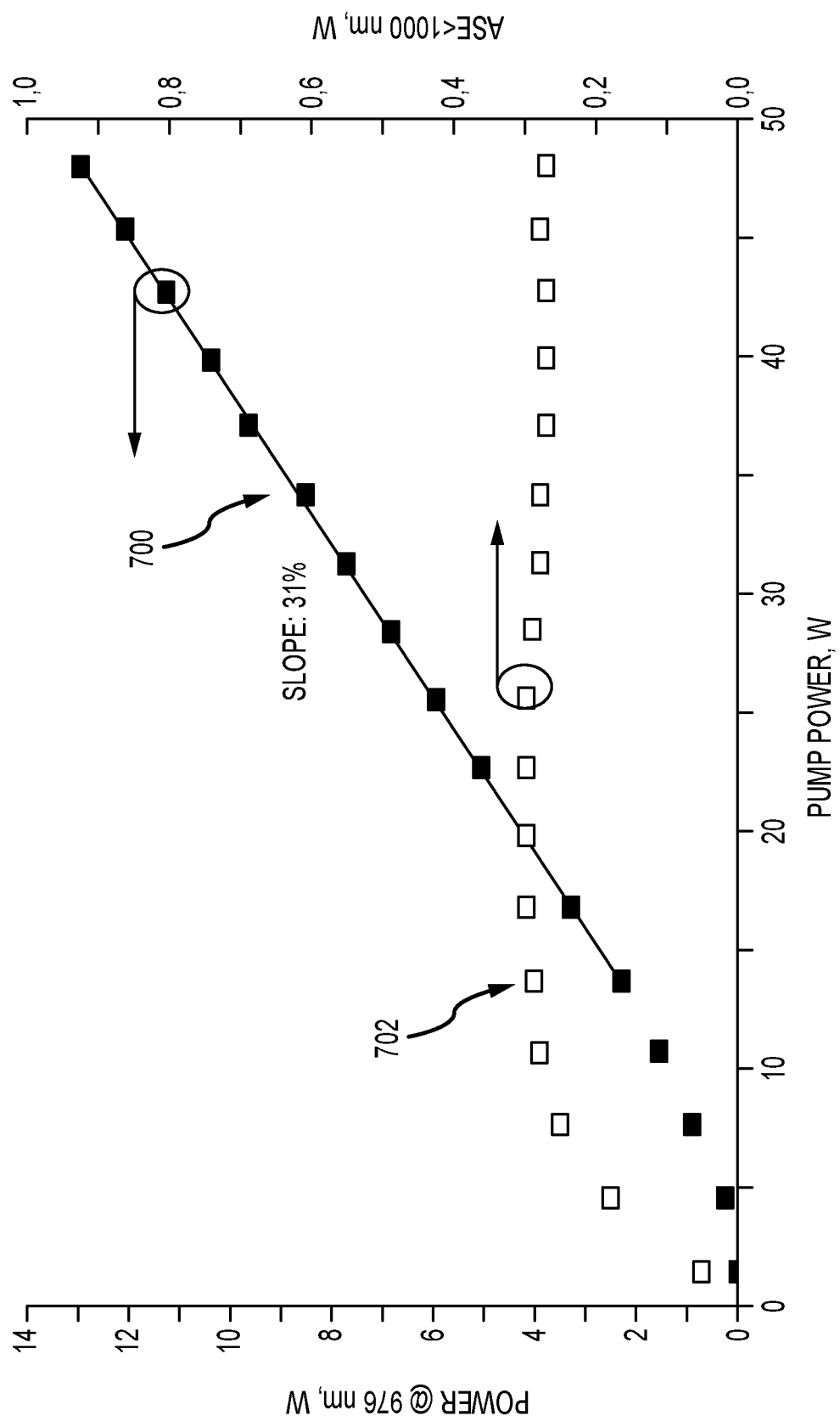
FIG. 7 is a plot of output power and ASE versus pump power for a particular embodiment of a fiber amplifier.
Figure 8:
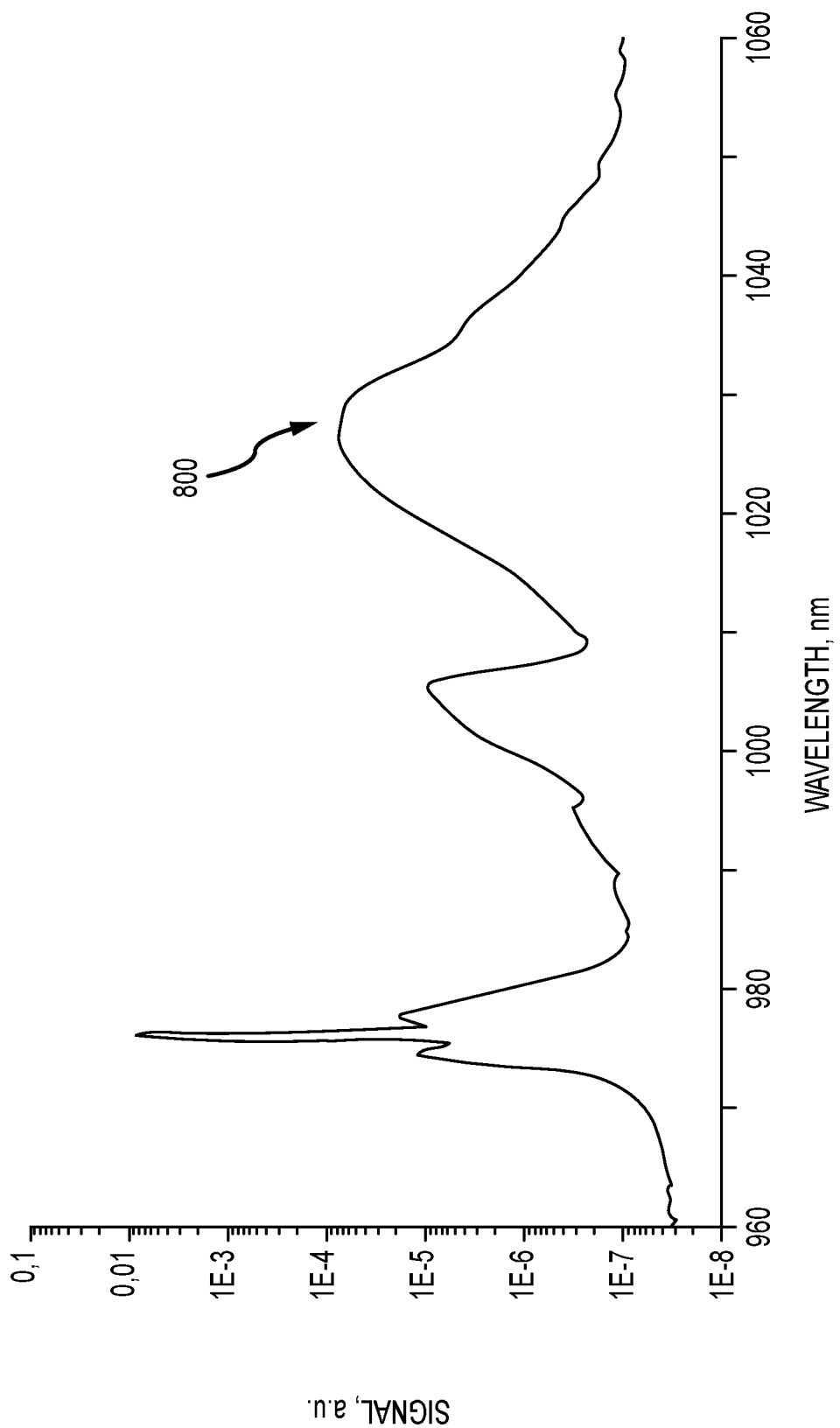
FIG. 8 is a plot of the output power spectrum of the fiber amplifier.

A single-frequency fiber laser with an output power up to 200 mW at 976 nm was used as a seed source. The fiber amplifier was pumped by two 25 W multimode diode lasers at 915 nm. The pump combiner had a fiber pigtail with core/clad diameter of 5.3/125 μm and NA of 0.14/0.46. The end of the fiber pigtail was tapered using Fujikura LZM 100 laser splicer down to 45 μm. The length of the taper was 25 mm. The calculated mode field diameter after tapering to an outer diameter of 45 μm was about 13 μm. The tapered fiber was spliced to the 55 cm piece of the bare fiber. The other end of the Yb-doped fiber was spliced to the passive LMA commercial fiber with core diameter of 10 μm and core NA of 0.08 (MFD @ 976 nm~10.3 μm). The stripped part of the passive fiber was put in high-index transparent epoxy or polymer adhesive to remove unabsorbed pump power [206]. The output end of the passive fiber was angle-cleaved to avoid back reflection. The laser beam was collimated, and power at 976 nm and ASE near 1030 nm was measured separately using long-pass filter with cutoff at 1000 nm. The maximum output power 700 of 13 W @ 976 nm was achieved with 31% slope efficiency as shown in FIG. 7. The power was limited only by available pump power. The 1030 nm ASE power 702 grew to 0.3 W at 10 W of pump and then stayed same at higher pump powers. The output spectrum 800 of the laser is shown in FIG. 8.

We demonstrated an efficient all-fiber high-power amplifier based on an active fiber (bare fiber) with a small cladding diameter e.g. 10 μm core/45 μm cladding, core/cladding 1:4.5). To the best of our knowledge the slope efficiency of 30% is the highest efficiency ever demonstrated for high-power all-fiber Yb-doped fiber amplifiers operating near 976 nm. It should be noted, that the rare earth dopant, here Yb, concentration in the demonstrated fiber was relatively low and could be easily increased without any photo darkening related issues. Thus, based on our simulations the length of the active fiber could be decreased even below 10 cm.

The gain fiber assembly can be used in a variety of fiber optical application systems e.g. fiber lasers and fiber amplifiers. Such applications may include but are not limited to, Yb- or Nd-doped lasers/amplifiers operating near 976 nm or 915 nm respectively.

Due to the high pump brightness, the amplifiers based on the fiber with small outer cladding diameter will have high level of population inversion. This will allow more efficient amplification of signal at 976/915 nm and suppression of ASE near 1030/1064 nm that typically limits efficiency of such amplifiers.

Yb-free Er-doped fiber lasers/amplifiers. Increasing the core-to-cladding area ratio of cladding-pumped Yb-free Er-doped fibers allows for significantly raising their pump conversion efficiency due to suppression of loss associated with pair-induced quenching.

High peak power and single frequency amplifiers. Increase of pump absorption due to small cladding diameter will allow use of shorter fiber length (approximately proportionally to square of the diameters ratio). As a result, about one-tenth the fiber length might be used when outer diameter is decreased from 125 to 40 μm. Therefore, such a laser might provide ~10 times higher peak power before nonlinear effects arise. Thus, the performance of all kinds of pulsed fiber amplifiers (from fs to ms pulse duration) as well as single-frequency amplifiers might be improved.

Short wavelength Tm-doped fiber lasers. High level of population inversion will improve efficiency of such lasers operating near 1700 nm.

Compact laser systems. As it was discussed before, the length of the active part of the proposed laser might be decreased down to ~10 cm or less. Thus, such lasers might be used where small footprint and efficiency are critical, such as in aerospace or military applications.

This approach is applicable to all optical wavelengths (deep UV to long wavelength IR) and to all combinations of polarization maintaining (PM) and non-PM fibers.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A fiber optical amplification system, comprising:
 a passive double-clad input fiber including a passive core with diameter D1, a $1^{st}$ glass cladding of diameter D2 and a $2^{nd}$ cladding of diameter D3 configured to receive and propagate an optical signal in the passive core and an optical pump in the passive core and $1^{st}$ glass cladding, a tapered end section of the input fiber without the $2^{nd}$ cladding having a final diameter D4<D2;
 an active single mode fiber including an active core and only a $1^{st}$ glass cladding having a diameter D4 less than 80 microns, one end of said active single-mode fiber spliced to the final diameter D4 of the tapered end section of the passive double-clad input fiber to receive and amplify the optical signal in the active core; and a passive double-clad output fiber spliced to the opposite end of the active single mode fiber to receive and output the amplified optical signal, wherein a glass-fluid interface along the tapered end section of the passive double-clad input fiber and the active single mode fiber provides guidance of the optical pump into and along the $1^{st}$ glass cladding of the active single mode fiber.

2. The fiber optical amplification system of claim 1, wherein the input fiber's $1^{st}$ glass cladding diameter D2 is greater than 105 microns and the active single mode fiber's $1^{st}$ glass cladding diameter D4 is less than 60 microns.

3. The fiber optical amplification system of claim 2, wherein the active single mode fiber's $1^{st}$ glass cladding diameter D4 is less than 40 microns.

4. The fiber optical amplification system of claim 2, wherein the input fiber has a numerical aperture (NA) less than 0.6 and the active single mode fiber has a NA greater than 0.8.

5. The fiber optical amplification system of claim 1, wherein the tapered end section has an adiabatic taper.

6. The fiber optical amplification system of claim 1, further comprising a section of the input fiber without the $2^{nd}$ cladding adjacent the tapered end section.

7. The fiber optical amplification system of claim 1, wherein the diameter D1 of the passive core of the input fiber is less than the diameter of the active core of the active single mode fiber.

8. The fiber optical amplification system of claim 1, wherein the active single mode fiber has a core to $1^{st}$ cladding ratio of 1:N where N<8.

9. The fiber optical amplification system of claim 1, wherein the input and output fibers comprise fused silica having a first refractive index, wherein the active single mode fiber comprises a glass having a second refractive index greater than said first refractive index.

10. The fiber optical amplification system of claim 1, wherein the active single mode fiber has a maximum length without onset of parasitic non-linear effects.

11. The fiber optical amplification system of claim 1, wherein the fluid comprises a gas having a refractive index RI where 1<RI<1.01, wherein a numerical aperture NA of the active single mode fiber is greater than 1.

12. The fiber optical amplification system of claim 1, wherein the fluid comprises a liquid having a refractive index RI where 1<RI<1.2, wherein a numerical aperture NA of the active single mode fiber is greater than 0.8.

13. A fiber optical amplification system, comprising:
a passive double-clad input fiber including a passive core with diameter D1, a $1^{st}$ glass cladding of diameter D2 and a $2^{nd}$ cladding of diameter D3 configured to receive and propagate an optical signal in the passive core and an optical pump in the passive core and $1^{st}$ glass cladding, a tapered end section of the input fiber without the $2^{nd}$ cladding having a final diameter D4<D2;

an active single mode fiber including an active core and only a $1^{st}$ glass cladding having a diameter D4 less than 80 microns, one end of said active single-mode fiber spliced to the final diameter D4 of the tapered end section of the passive double-clad input fiber to receive and amplify the optical signal in the active fiber core;

a passive double-clad output fiber spliced to the opposite end of the active single mode fiber to receive and output the amplified optical signal;

an enclosure that houses the tapered end section of the input fiber and active single mode fiber with said passive double-clad input and output fibers penetrating through the enclosure; and inlet and outlet ports in the enclosure configured to receive, circulate and remove a fluid to remove heat from the active single mode fiber, wherein a glass-fluid interface along the tapered end section of the passive double-clad input fiber and the active single mode fiber provides guidance of the optical pump into and along the $1^{st}$ glass cladding of the active single mode fiber.

14. The fiber optical amplification system of claim 13, wherein the input fiber's $1^{st}$ glass cladding diameter D2 is greater than 105 microns and the active single mode fiber's $1^{st}$ glass cladding diameter D4 is less than 60 microns.

15. The fiber optical amplification system of claim 14, wherein the input fiber has a numerical aperture (NA) less than 0.6 and the active single mode fiber has a NA greater than 0.8.

16. The fiber optical amplification system of claim 13, wherein the active single mode fiber has a core to $1^{st}$ cladding ratio of 1:N where N<8.

17. The fiber optical amplification system of claim 13, wherein the fluid comprises a gas having a refractive index RI where 1<RI<1.01, wherein a numerical aperture NA of the active single mode fiber is greater than 1.

18. The fiber optical amplification system of claim 13, wherein the fluid comprises a liquid having a refractive index RI where 1<RI<1.2, wherein a numerical aperture NA of the active single mode fiber is greater than 0.8.

19. A fiber optical amplification system, comprising:
a passive double-clad input fiber including a passive core with diameter D1, a $1^{st}$ glass cladding of diameter D2 and a $2^{nd}$ cladding of diameter D3 configured to receive and propagate an optical signal in the passive core and an optical pump in the passive cladding and $1^{st}$ glass cladding, a tapered end section of the input fiber without the $2^{nd}$ cladding having a final diameter D4<D2;

an active single mode fiber including an active core and only a $1^{st}$ glass cladding having a diameter D4 less than 80 microns, one end of said active single-mode fiber spliced to the final diameter D4 of the tapered end section of the passive double-clad input fiber to receive and amplify the optical signal in the active fiber core;

a passive double-clad output fiber spliced to the opposite end of the active single mode fiber to receive and output the amplified optical signal; and a vacuum enclosure that houses the tapered end section of the input fiber and the active single mode fiber in a vacuum with said passive double-clad input and output fibers penetrating through the enclosure, wherein a glass-vacuum interface along the tapered end section of the passive double-clad input fiber and the active single mode fiber provides guidance of the optical pump into and along the $1^{st}$ glass cladding of the active single mode fiber and a numerical aperture (NA)>1 of the active single mode fiber.

20. The fiber optical amplification system of claim 19, wherein the input fiber's $1^{st}$ glass cladding diameter D2 is greater than 105 microns and the active single mode fiber's $1^{st}$ glass cladding diameter D4 is less than 60 microns, wherein the input fiber has a numerical aperture (NA) less than 0.6 and the active single mode fiber has a NA greater than 0.8, wherein the active single mode fiber has a core to $1^{st}$ cladding ratio of 1:N where N<8.

* * * * *